(12) United States Patent
Son

(10) Patent No.: US 11,279,364 B2
(45) Date of Patent: Mar. 22, 2022

(54) VEHICLE AND METHOD OF CALCULATING DRIVING LOAD THEREFOR

(71) Applicants: Hyundai Motor Company, Seoul (KR); Kia Motors Corporation, Seoul (KR)

(72) Inventor: Hui Un Son, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 178 days.

(21) Appl. No.: 16/696,488

(22) Filed: Nov. 26, 2019

(65) Prior Publication Data

US 2020/0391741 A1 Dec. 17, 2020

(30) Foreign Application Priority Data

Jun. 14, 2019 (KR) .......................... 10-2019-0070552

(51) Int. Cl.
*B60W 20/11* (2016.01)
*B60W 40/13* (2012.01)
*B60W 30/182* (2020.01)

(52) U.S. Cl.
CPC .......... *B60W 30/182* (2013.01); *B60W 20/11* (2016.01); *B60W 40/13* (2013.01); *B60W 2555/20* (2020.02)

(58) Field of Classification Search
CPC .... B60W 30/182; B60W 20/11; B60W 40/13; B60W 2555/20; B60W 2710/244; B60W 20/15; B60W 20/20; B60W 40/1005; B60W 10/08; B60W 10/06; B60W 40/02; B60W 40/105; B60W 50/14; B60W 2050/146; B60W 2520/10; B60W 2530/16;

(Continued)

(56) References Cited

U.S. PATENT DOCUMENTS

2016/0016525 A1* 1/2016 Chauncey ............ G07C 5/0808
  701/123
2018/0111615 A1* 4/2018 Yamakado ........ B60W 40/1005
(Continued)

FOREIGN PATENT DOCUMENTS

JP   H06-258193 A   9/1994
JP   2000-318634 A   11/2000
(Continued)

OTHER PUBLICATIONS

John Barrere "Rain on cart problem" (Year: 2001).*

*Primary Examiner* — Abby Y Lin
*Assistant Examiner* — Esvinder Singh
(74) *Attorney, Agent, or Firm* — Mintz Levin Cohn Ferris Glovsky and Popeo, P.C.; Peter F. Corless

(57) ABSTRACT

A vehicle and a method of calculating a load therefor for calculating a driving load based on a weather condition are provided. The method includes acquiring weather information regarding rain or snow and calculating a first driving load applied to an upper surface portion of the vehicle based on the weather information. A second driving load applied to a front surface portion of the vehicle is calculated based on the weather information and a third driving load that is a driving load due to weather is calculated by summing the first driving load and the second driving load.

16 Claims, 13 Drawing Sheets

(58) Field of Classification Search
CPC .. B60K 6/48; B60K 2006/4825; B60K 35/00; Y02T 10/62
See application file for complete search history.

(56) References Cited

U.S. PATENT DOCUMENTS

| | | | |
|---|---|---|---|
| 2019/0135284 A1* | 5/2019 | Tokita | B60W 30/182 |
| 2020/0055471 A1* | 2/2020 | Niedert | G06F 3/0482 |
| 2020/0183425 A1* | 6/2020 | Yamashita | B64C 13/16 |
| 2020/0238929 A1* | 7/2020 | Wippler | B60C 23/04 |

FOREIGN PATENT DOCUMENTS

| | | |
|---|---|---|
| KR | 10-1509700 B1 | 4/2015 |
| KR | 10-2016-0059797 A | 5/2016 |
| KR | 10-1699884 B1 | 1/2017 |

* cited by examiner

VEHICLE AND METHOD OF CALCULATING DRIVING LOAD THEREFOR

CROSS-REFERENCE TO RELATED APPLICATION(S)

This application claims the benefit of Korean Patent Application No. 10-2019-0070552, filed on Jun. 14, 2019, which is hereby incorporated by reference as if fully set forth herein.

BACKGROUND

Field of the Invention

The present disclosure relates to a vehicle for calculating a driving load based on a weather condition and a method of calculating a driving load therefore.

Discussion of the Related Art

A hybrid electric vehicle (HEV) is a vehicle that uses two power sources, typically an engine and an electric motor. An HEV has excellent fuel efficiency and engine performance compared with a vehicle having only an internal combustion engine and is also advantageous for reducing emissions, and thus has been actively developed recently. The hybrid vehicle travels in two modes according to a powertrain used to drive the vehicle.

One of the modes is an electric vehicle (EV) mode in which the vehicle is driven using an electric motor and the other mode is a hybrid electric vehicle (HEV) mode of operating both an electric motor and an engine. A hybrid vehicle switches between the two modes based on driving conditions. In addition to the aforementioned classification of a driving mode according to a powertrain, in particular, for a plug-in hybrid electric vehicle (PHEV), a driving mode may be classified into a charge depleting (CD) mode and a charge sustaining (CS) mode based on a change in a battery state of charge (SoC). In general, a vehicle is operated by driving an electric motor using battery power without power of an engine in a CD mode and is operated using engine power not to further lower a battery SoC in a CS mode.

For a general PHEV, the vehicle is driven in a CD mode irrespective of a driving condition such as driving load, whether a battery is rechargeable, and a distance to a destination and, then, switches the current mode to a CS mode as an SoC is depleted, which will be described with reference to FIG. 1. FIG. 1 is a diagram showing an example of a general PHEV that switches between modes according to the related art.

In FIG. 1, the horizontal axis is distance, the vertical axis of an upper graph is battery SoC of the PHEV, and the vertical axis of a lower graph is driving load. First, referring to the lower graph of FIG. 1, downtown road, national highway, and expressway sections coexist between a starting point and a destination, and a path along which driving load is decreased in the stated order of expressway-national highway-downtown road is present. When the general PHEV travels along the path, the vehicle starts traveling in a CD mode without consideration of change in driving load and, then, switches to a CS mode when the SoC is decreased below a predetermined reference.

However, the CD mode has advantageous efficiency during low speed/low load driving and the CS mode has advantageous efficiency during high speed/high load driving. The characteristics of a hybrid vehicle will be described with reference to FIG. 2. FIG. 2 is a diagram for explanation of powertrain energy efficiency characteristics of a general hybrid vehicle according to the related art.

In FIG. 2, the horizontal axis is power of a powertrain and the vertical axis is system efficiency of a powertrain. Referring to FIG. 2, EV mode traveling using an electric motor is effective in a section with low power but HEV mode traveling is effective after an intersection point (A) of EV mode efficiency and HEV mode efficiency. In general, an electric motor reaches a maximum output point (C) earlier than an engine. Accordingly, the point (A) may be a reference for engine driving in a CS mode, and the point (B) with maximum HEV mode efficiency may be a reference for engine driving in a CD mode.

As a result, similar to the method described above with reference to FIG. 1, when mode switching is performed based on only a SoC value, a driving load is not considered, and thus efficiency may be degraded depending on a route. Accordingly, an adaptive mode switching (adaptive CD/CS) method may be considered. The adaptive CD/CS method is a control method of automatically switching CD/CS modes to achieve optimum efficiency using a distance until charge (DUC) as a distance to next recharging, drive to empty (DTE) as a driving distance range in an EV mode, a driving condition, navigation information, and so on when the vehicle travels a longer distance than an all-electric range (AER) as a driving distance range using an electric motor.

For example, when the adaptive CD/CS method is used, a vehicle is driven in a CS mode when current load is equal to or greater than a predetermined value based on a driving condition and the vehicle is driven in a CD mode when the driving load is low. Needless to say, when DUC=DTE even if a vehicle is driven through a section with high driving load, the vehicle may travel in the CD mode, depleting an SoC and, thus, may be guided to deplete an SoC in the DUC. The adaptive CD/CS method will be described below with reference to FIG. 3.

FIG. 3 is a diagram showing an example a general PHEV that switches between modes when an adaptive CD/CS method is applied according to the related art. In FIG. 3, the horizontal and vertical axes and path configuration are assumed to be the same as in FIG. 1. Referring to FIG. 3, the vehicle may start traveling in a CD mode but, when the vehicle enters a section (e.g., an expressway) with driving load that exceeds predetermined driving load, even if an SoC is equal to or greater than a predetermined value, the vehicle may switch to a CS mode and, may switch back to the CD mode in a section with DUC=DTE, thereby enabling effective driving.

A hybrid vehicle may be capable of enhancing efficiency through a coasting driving guidance system as well as enhancing efficiency based on the aforementioned mode switching. In particular, when a deceleration situation is supposed or predicted, if a vehicle is guided for coasting driving ("inertia driving" or "coasting driving") to make a driver disengage an acceleration pedal at an appropriate time point, unnecessary fuel consumption may be prevented. In particular, during coasting driving of a hybrid vehicle including a driving electric motor, since an acceleration pedal is not manipulated, fuel consumption is reduced, and when deceleration is required without use of a hydraulic brake, further enhancement in fuel efficiency may be expected compared to when regenerative braking force of an electric motor is used, which will be described with reference to FIG. 4.

FIG. 4 is a diagram for explanation of a concept of general guidance for coasting driving according to the related art. Referring to FIG. 4, when a vehicle acquires navigation information or information regarding a forward deceleration event through a vehicle sensor, a left distance to a forward deceleration event and a target speed may be calculated. When the calculated information is matched with deceleration based on a driving load of a vehicle, a distance required to perform coasting driving for reaching the target speed from a current vehicle speed may be calculated. Accordingly, when a vehicle transmits notification in a predetermined form to a driver at a time point at which the left distance to the forward deceleration event reaches a distance at which coasting driving is required, the driver disengages an acceleration pedal to start coasting driving, and it may be possible to perform regenerative braking as well as to reduce fuel consumption from a time point when the acceleration pedal is released.

It is important to predict a driving load to maximize the efficiency of the aforementioned adaptive mode switching control or guidance for coasting driving. However, general technology of predicting a driving load broadly considers only rolling resistance, air resistance, and gradient resistance but does not consider a driving load based on change in a weather condition such as rain or snow.

SUMMARY

An object of the present disclosure is to provide a vehicle and a method of calculating a driving load therefor for more accurately predicting a driving load. In particular, the present disclosure provides a vehicle having enhanced accuracy of predicting a driving load by further considering a weather condition to predict a driving load.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In accordance with the purpose of the disclosure, as embodied and broadly described herein, a method of calculating a driving load of a vehicle may include acquiring weather information, calculating a first driving load applied to an upper surface portion of the vehicle based on the weather information, calculating a second driving load applied to a front surface portion of the vehicle based on the weather information, and calculating a third driving load that is a driving load due to weather by summing the first driving load and the second driving load.

In another aspect of the present disclosure, a vehicular controller for calculating driving load information may include a first calculation unit configured to calculate a first driving load applied to an upper surface portion of a vehicle based on weather information, a second calculation unit configured to calculate a second driving load applied to a front surface portion of the vehicle based on the weather information, and a third calculation unit configured to calculate a third driving load that is a driving load due to weather by summing the first driving load and the second driving load.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings.

DETAILED DESCRIPTION

Figure 1:
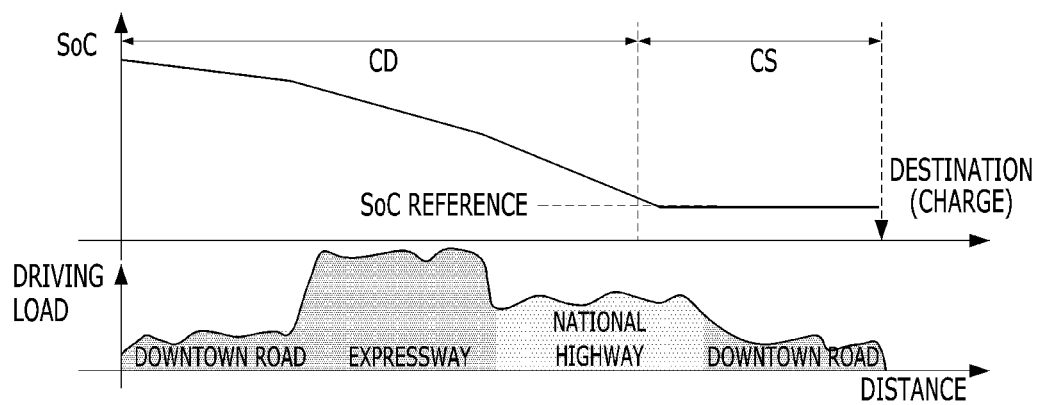
FIG. 1 is a diagram showing an example of a general plug-in hybrid electric vehicle (PHEV) that switches between modes accord to the related art.
Figure 2:
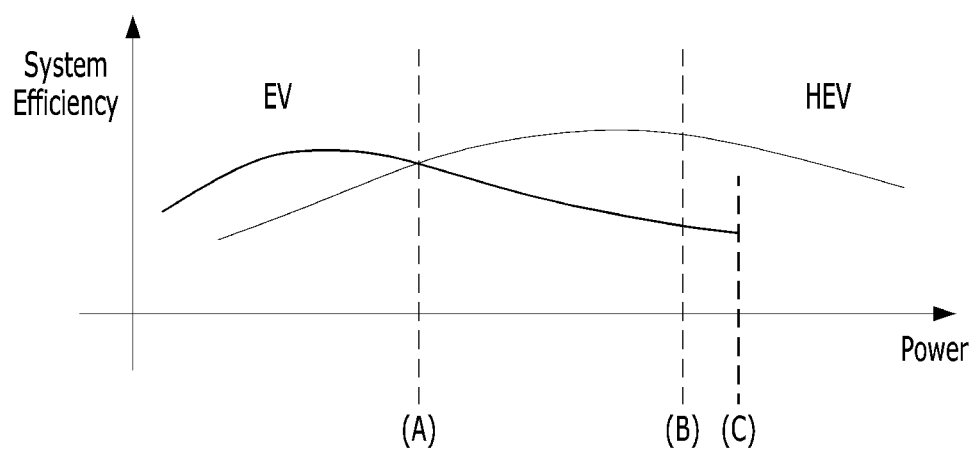
FIG. 2 is a diagram for explanation of powertrain energy efficiency characteristics of a general hybrid vehicle accord to the related art.
Figure 3:
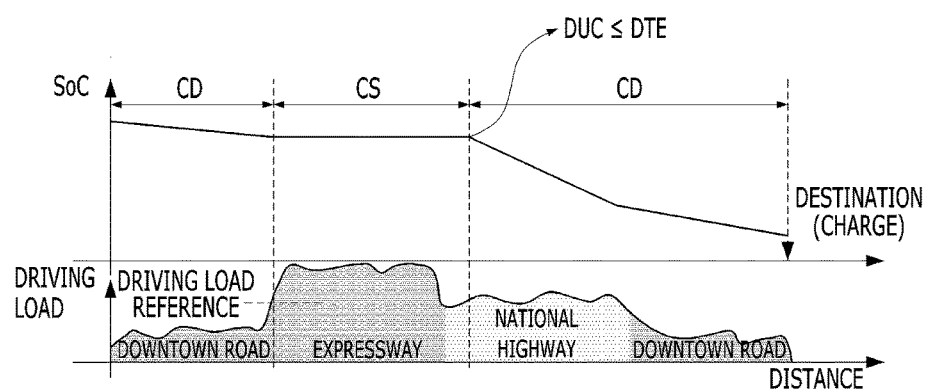
FIG. 3 is a diagram showing an example of a general PHEV that switches between modes when an adaptive CD/CS method is applied accord to the related art.
Figure 4:
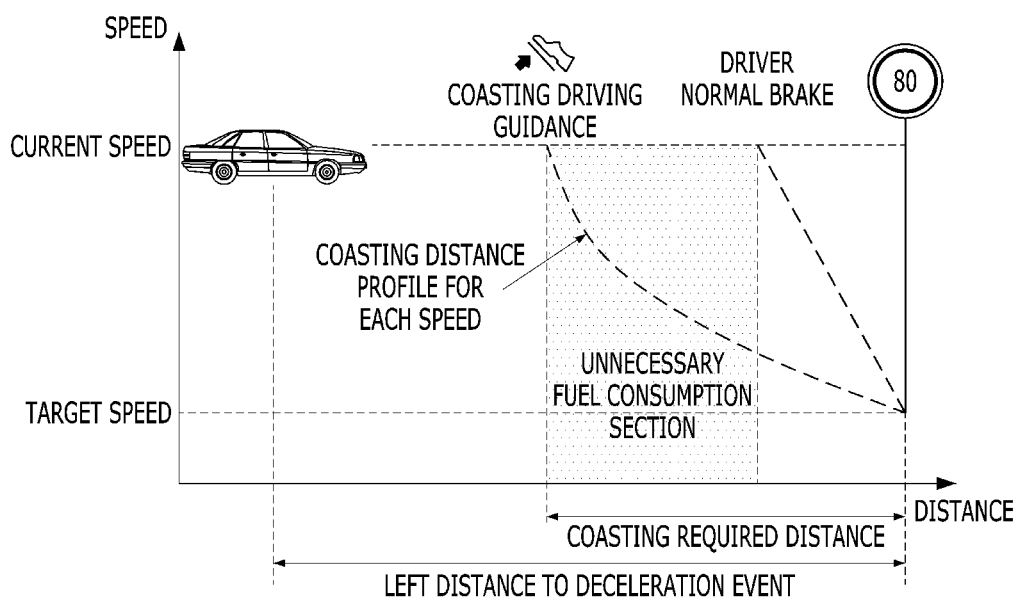
FIG. 4 is a diagram for explanation of a concept of general guidance for coasting driving accord to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure are described in detail so as for those of ordinary skill in the art to easily implement with reference to the accompanying drawings. However, the present disclosure may be implemented in various different forms and is not limited to these exemplary embodiments. To clearly describe the present disclosure, a part without concerning to the description is omitted in the drawings, and like reference numerals in the specification denote like elements.

The same reference numbers will be used throughout the drawings and the specification to refer to the same parts. Prior to the description of a hybrid vehicle and a method of controlling driving thereof according to an exemplary embodiment of the present disclosure, the configuration and a control system of a hybrid vehicle to which exemplary embodiments are applicable will described.

Figure 5:
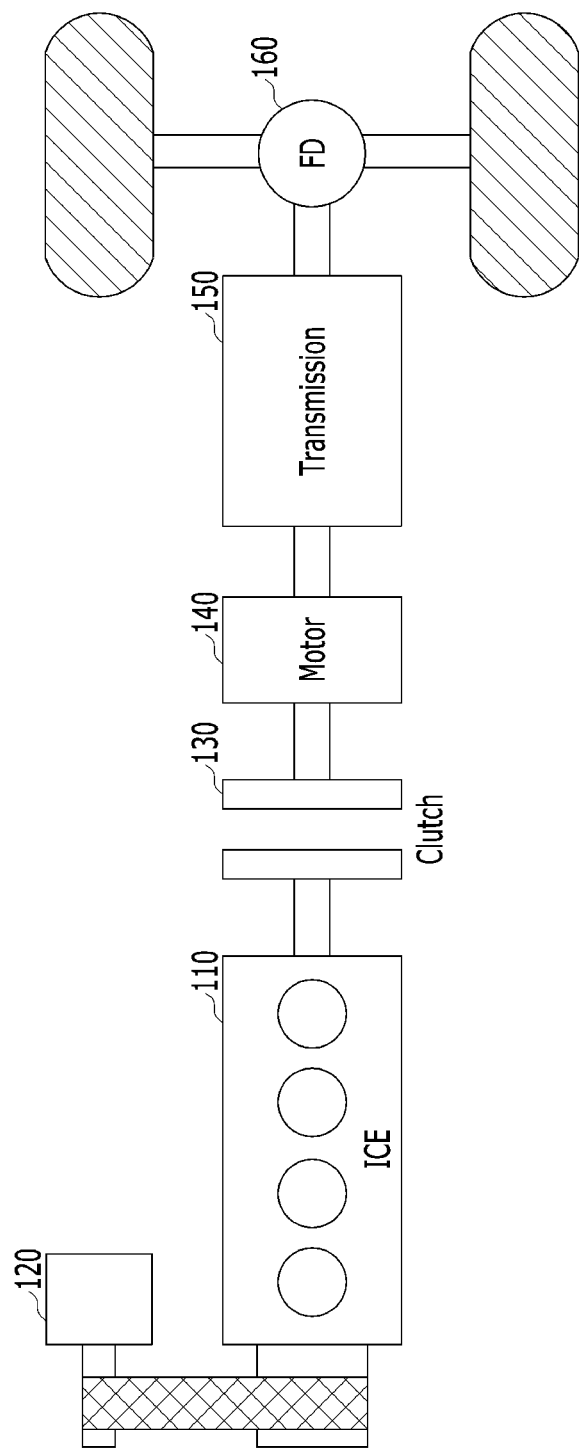
FIG. 5 is a diagram illustrating an example of a powertrain structure of a parallel-type hybrid vehicle to which exemplary embodiments of the present disclosure are applicable.

FIG. 5 is a diagram illustrating an example of a powertrain structure of a parallel type hybrid vehicle to which exemplary embodiments of the present disclosure are applicable. FIG. 5 illustrates a powertrain of a hybrid vehicle employing a parallel type hybrid system including a driving motor 140 and an engine clutch 130 mounted between an internal combustion engine (ICE) 110 and a transmission 150. In general, when a driver engages an accelerator after starting the vehicle, the driving motor 140 may be driven using power of a battery while the engine clutch 130 is open and may be configured to transmit power to move wheels through the transmission 150 and a final drive (FD) 160 (i.e., EV mode). As the vehicle gradually accelerates, high traction force is further required, in which case a starter generator motor 120 may be operated to drive the engine 110.

Accordingly, when the rotational speeds of the engine 110 and the motor 140 are the same as each other, the engine clutch 130 may be engaged such that both the engine 110 and the motor 140 drive the vehicle (i.e., transition to an HEV mode from an EV mode). When a predetermined engine off condition, such as vehicle deceleration, is satisfied, the engine clutch 130 may be opened to stop the engine 110 (i.e., transition to an EV mode from an HEV mode).

In addition, the hybrid vehicle may be configured to convert traction force of a wheel into electric energy to recharge the battery, which is referred to as braking energy regeneration or regenerative braking. The starter generator motor 120 may operate as a starter motor when the engine is turned on and operate as a generator after the engine is turned on or when rotational energy is recovered during engine off, and thus, the starter generator motor 120 may also be referred to as a hybrid starter generator (HSG), and as necessary, may be referred to as an auxiliary motor.

Figure 6:
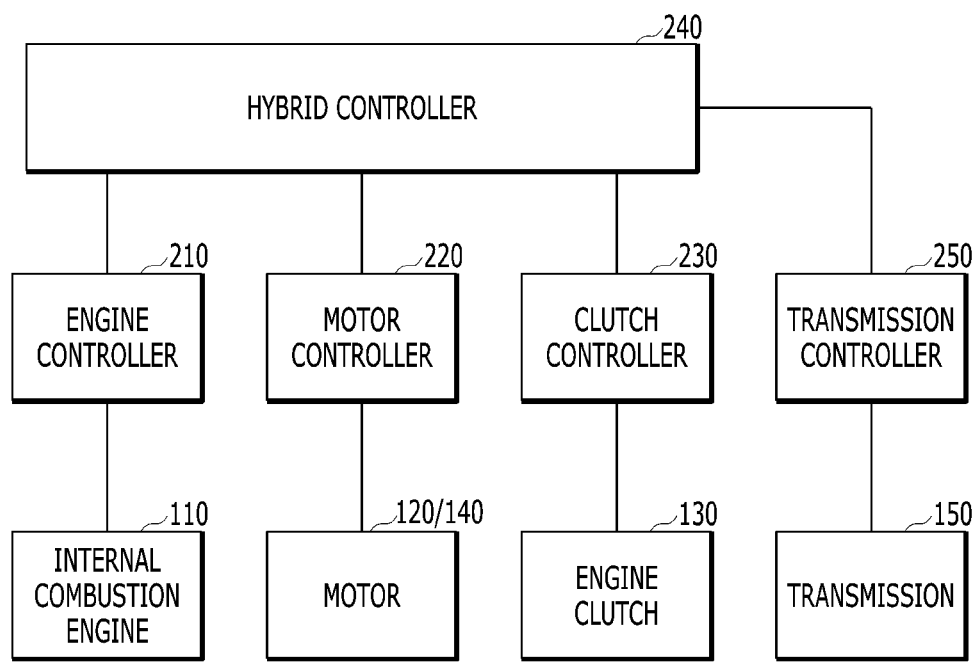
FIG. 6 is a block diagram showing an example of a control system of a hybrid vehicle to which exemplary embodiments of the present disclosure are applicable.

A relationship among controllers of a vehicle including such a powertrain is shown in FIG. 6. FIG. 6 is a block diagram showing an example of a control system of a hybrid vehicle to which exemplary embodiments of the present disclosure are applicable. Referring to FIG. 6, in the hybrid vehicle to which exemplary embodiments of the present disclosure are applicable, the internal combustion engine 110 may be operated by an engine controller 210, the torque of the starter generator motor 120 and the driving motor 140 may be adjusted by a motor control unit (MCU) 220, and the engine clutch 130 may be operated by a clutch controller 230. Particularly, the engine controller 210 may also be referred to as an engine management system (EMS). In addition, the transmission 150 may be operated by a transmission controller 250.

Each controller may be connected to a hybrid control unit (HCU) 240 configured to execute an overall mode-switching procedure as a high-level controller and may provide, to the hybrid controller 240, information required to switch driving modes and to operate an engine clutch during gear shifting, and/or information required to turn the engine off, or may perform an operation according to a control signal from the hybrid controller 240. In particular, the hybrid controller 240 may be configured to determine whether modes are switched based on a driving state of a vehicle.

For example, the hybrid controller may be configured to determine an open time of the engine clutch (EC) 130 and may be configured to adjust hydraulic pressure (e.g., in the case of a wet EC) or adjust torque capacity (e.g., in the case of a dry EC) when the EC is open. The hybrid controller 240 may be configured to determine an EC state (e.g., lock-up, slip, open, etc.) and adjust a time for stoppage of fuel injection of the engine 110. Additionally, the hybrid controller may be configured to transmit a torque command for adjusted torque of the starter generator motor 120 to the MCU 220 to turn the engine off and execute engine rotational energy recovery. The hybrid controller 240 may also be configured to determine a mode switching condition during execution of driving mode switching and may be configured to operate a low-level controller for mode switching.

Needless to say, it will be obvious to one of ordinary skill in the art that the aforementioned relationship between the controllers and functions/divisions of the controllers are exemplary, and thus, the present disclosure is not limited to the terms. For example, the hybrid controller 240 may be embodied by allowing any one of controllers other than the hybrid controller 240 to provide a corresponding function, or two or more other controllers may provide the corresponding function in a distributed manner.

The aforementioned configuration of FIGS. 5 and 6 is merely an example of the configuration of a hybrid vehicle, and it will be obvious to one of ordinary skill in the art that a hybrid vehicle applicable to an exemplary embodiment is not limited to the configuration. Hereinafter, the configuration of a controller for predicting a driving load in consideration of a weather condition according to an exemplary embodiment will be described with reference to FIGS. 7A and 7B.

Figure 7A:
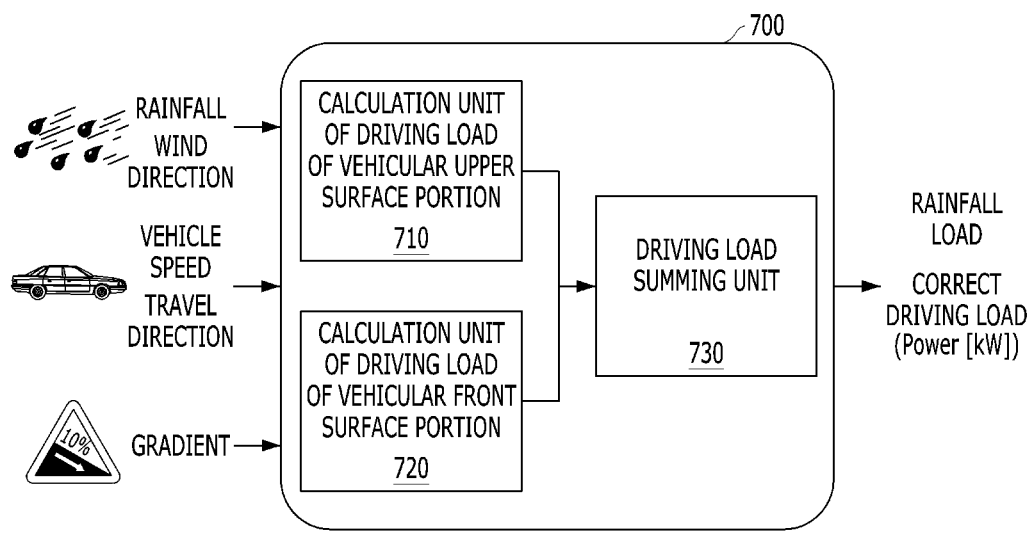
FIG. 7A illustrates an example of the configuration of a controller for predicting a driving load according to an exemplary embodiment of the present disclosure.
Figure 7B:
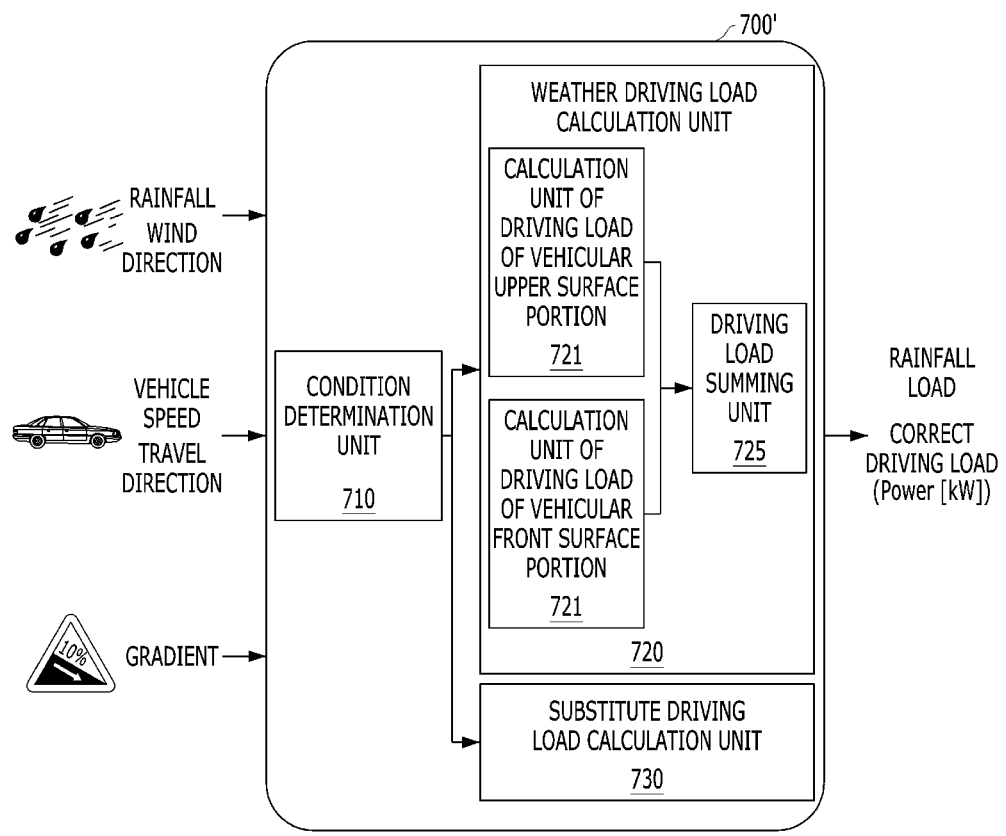
FIG. 7B illustrates another example of a controller for predicting a driving load according to an exemplary embodiment of the present disclosure.

FIG. 7A illustrates an example of the configuration of a controller for predicting a driving load according to an exemplary embodiment of the present disclosure. FIG. 7B illustrates another example of a controller for predicting a driving load according to an exemplary embodiment of the present disclosure.

Referring to FIG. 7A, a controller 700 configured to predict a driving load based on a weather condition may receive the amount of rainfall, a wind direction, a vehicle speed, a travel direction, and a gradient as an input value. In particular, the amount of rainfall may be replaced with the amount of snowfall when it snows. The amount of rainfall and the wind direction may be acquired from an external device configured to detect and provide weather information, for example, a server or telematics center for providing weather information.

The vehicle speed may be acquired from a vehicle speed sensor or a navigation system, and the travel direction may be acquired from a navigation system. In addition, the gradient information may be acquired from map information of a navigation device or may also be acquired from a gradient sensor mounted within a vehicle. Needless to say, it will be obvious to one of ordinary skill in the art that the aforementioned method of acquiring each information item or acquisition route is exemplary and is changeable in various forms.

The controller 700 may include a calculation unit 721 of driving load of a vehicular upper surface portion, configured to calculate a driving load applied to the vehicular upper surface portion due to raining or snowing, a calculation unit 723 of driving load of a vehicular front surface portion, configured to calculate a driving load applied to the vehicular front surface due to rain or snow, and a driving load summing unit 725 configured to calculate a driving load due to rain or snow by summing the two loads that are respectively calculated by the calculation unit 721 of driving load of the vehicular upper surface portion and the calculation unit 723 of driving load of the vehicular front surface portion.

The driving load due to rain or snow calculated by the controller 700 may be added to a general driving load (i.e., rolling resistance, air resistance, and gradient resistance) by a component (e.g., a hybrid controller) configured to determine the total driving load to constitute one component of the total driving load. In addition, the driving load summing unit 725 may be configured to calculate the general driving load and the driving load due to snow or rain to calculate the total driving load.

According to an exemplary embodiment, the controller 700 may be configured as a separate controller configured to calculate driving load due to raining/snowing or may also be embodied in one function or module of the hybrid controller 240. A controller 700' shown in FIG. 7B may further include a condition determination unit 710 and a substitute driving load calculation unit 730 in addition to the controller 700 shown in FIG. 7A. The calculation unit 721 of driving load of the vehicular upper surface portion, the calculation unit 723 of driving load of the vehicular front surface portion, and the driving load summing unit 725 may configure a weather driving load calculation unit 720. The components 721, 723, and 725 included in the weather driving load calculation unit 720 have the same functions as in FIG. 7A, and a repeated description will be omitted.

The condition determination unit 710 may be configured to compare a wind speed and a limit speed of rain with a vehicle speed. When the vehicle speed is greater than the wind speed and the limit speed of rain by a predetermined size or greater (i.e. $v_{wind} \ll v_{vehicle}$, and $v_{limit} \ll v_{vehicle}$), the substitute driving load calculation unit 730 may be configured to calculate a driving load due to rain or snow, and otherwise, the weather driving load calculation unit may be configured to calculate the driving load due to rain or snow. A detailed method of calculating the driving load due to rain or snow by the substitute driving load calculation unit 730 will be described below. Hereinafter, the principle and procedure of calculating a driving load of the controller 700 described above with reference to FIG. 7A will be described with reference to FIG. 8. In the following description, a weather condition is assumed to be raining for convenience of description.

Figure 8:
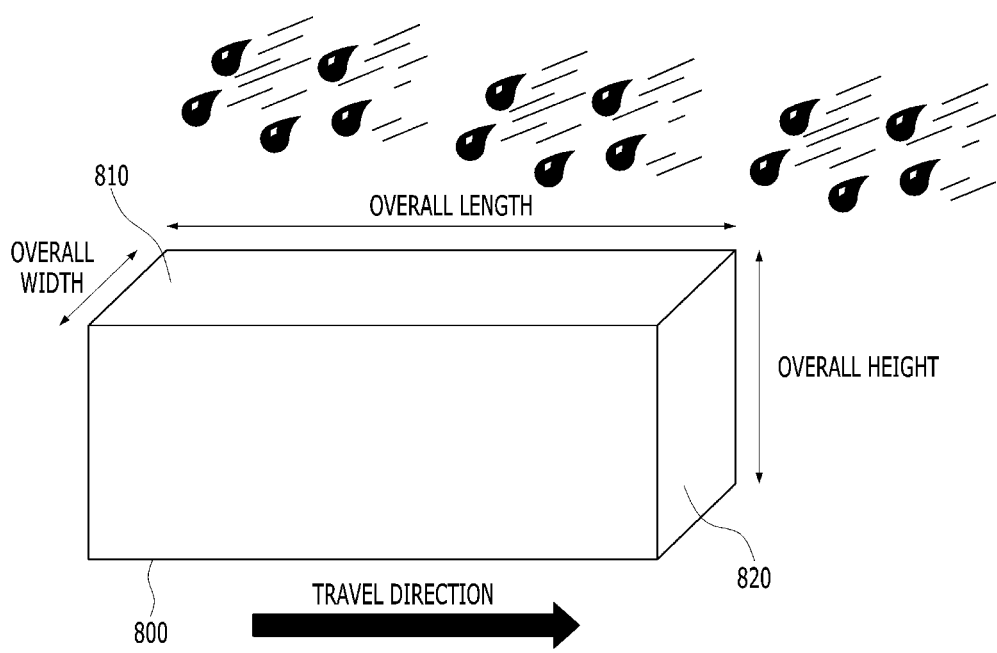
FIG. 8 is a diagram for explanation of a concept of external force applied to a vehicle body due to raining according to an exemplary embodiment of the present disclosure.

FIG. 8 is a diagram for explanation of a concept of external force applied to a vehicle body due to rain according to an exemplary embodiment of the present disclosure. Assumption applied to an action between a vehicle 800 shown in FIG. 8 and raindrops will now be described below.

Particularly, these assumptions include i) a vehicle is shaped like a rectangular parallelepiped, ii) raindrops perfectly inelastic-collides with a vehicle; iii) intensity of raindrops is 1 g/cm³; iv) a vertical limit speed of rain drops is 9 m/s; and v) a horizontal speed of raindrops is the same as a wind direction and a wind speed.

Meaning of signs shown hereinafter will now be described below.

λ: amount of rainfall [mm/h] per hour
ρ: Intensity of raindrops 1 g/cm³
$l_{length}$: overall length [mm]
$l_{width}$: overall width [mm]
$l_{height}$: overall height [mm]
$v_{vehicle}$: vehicle speed [m/s]
$v_{wind}$: wind speed [m/s]
θ: Direction difference between vehicle speed and wind speed
$m_{upper}$: Amount of rain falling onto upper surface [kg]
$m_{front}$: Amount of rain falling onto front surface [kg]

However, the aforementioned units of respective signs/factors are listed as separate and exemplary units that are generally and commonly used in corresponding factors, [m], [cm], and [mm] coexist for a length and [g] and [kg] coexist for a mass, and thus dimensions of units may be unified in actual calculation. For example, assuming that a vehicle width $l_{width}$ is about 2450 mm, a vehicle speed $v_{vehicle}$ is about 25 m/s, and raindrop density ρ is about 1 g/cm³, a calculation result of Equation "$l_{width} v_{vehicle} \rho$" may be given as 2450 [mm]*25 [m/s]*1 [g/cm^3]=61250 [mm*m*g/s*cm^3]=612500 [g/s*cm]=61250000 [g/s*m]=61250 [kg/s*m]. Dimensions of units may be easily unified by one of ordinary skill in the art, and thus a description of a separate unification procedure will be omitted in the following equations.

Based on the aforementioned assumption, a procedure of calculating a driving load applied to a vehicular upper surface portion 810 and a procedure of calculating a driving load applied to a vehicular front surface 820 will be sequentially described. First, for the vehicular upper surface portion 810, the amount of rain that falls onto the upper surface portion 810 may be constant irrespective of a vehicle speed. Thus, mass $\dot{m}_{upper}$ of rain that falls onto the upper surface portion 810 may be calculated according to $l_{length} l_{width} \lambda \rho$.

Raindrops perfectly inelastic-collides with a vehicle, and thus may have the same vehicle as the vehicle after collision, and in this regard, a driving load $p_{upper}$ applied to the upper surface portion 810 may be classified into the case in which a vehicle speed direction and a direction of a raindrop speed component (i.e., $v_{wind}$ cos θ where θ equal to or less than 90 degrees as an angle between the vehicle speed direction and the direction of raindrop speed on a plane), which is in parallel to the vehicle speed direction are the same and the case in which the two directions are opposite. In particular, when the two directions are opposite, the driving load $p_{upper}$ of the upper surface portion 810 may be given according to $½\dot{m}_{upper}(v_{wind}^2 + v_{vehicle}^2)$, and when the two directions are the same, the driving load may be calculated according to $p_{upper} = ½\dot{m}_{upper}[(v_{wind}^2 \sin^2 θ) + (v_{vehicle}^2 - v_{wind}^2 \cos^2 θ)]$ by the calculation unit 710 of driving load of the vehicular upper surface portion.

Further, for the front surface 820, a vertical limit speed of raindrops is 9 m/s and λ is the amount of rainfall, and thus the amount obtained by vertically collecting raindrops to 32.4 km (=9 m/s*1 h) is λ. Thus, the density of raindrops on the vehicular front surface is $(l_{height}/32.4 \text{ km/h})*λ$ and the mass $\dot{m}_{front}$ of rain applied to the front surface 820 may be given according to $$\left(\frac{l_{height}}{32.4}λ\right)l_{width}v_{vehicle}ρ.$$

Similarly for the upper surface portion 810, raindrops perfectly inelastic-collides with a vehicle, and thus may have the same vehicle as the vehicle after collision, and in this regard, a driving load $p_{front}$ applied to the front surface 820 may be classified into the case in which a vehicle speed direction and a direction of a raindrop speed component (i.e., $v_{wind}$ cos θ) are the same and the case in which the two directions are opposite. In particular, when the two directions are opposite, the driving load $p_{front}$ of the front surface 820 may be given according to $½\dot{m}_{front}(v_{wind}^2 + v_{vehicle}^2)$, and when the two directions are the same, the driving load may be calculated according to $½\dot{m}_{front}[(v_{wind}^2 \sin^2 θ) + (v_{vehicle}^2 - v_{wind}^2 \cos^2 θ)]$ by the calculation unit 720 of driving load of the vehicular front surface portion.

The respective driving loads calculated with respect to the upper surface portion 810 and the front surface 820 may be synthetically summed below. First, when the vehicle speed direction and a raindrop speed component (i.e., $v_{wind}$ cos θ) of a raindrop speed, which is in parallel to the vehicle speed direction, the total driving load p due to raining may be given according to $½\dot{m}(v_{wind}^2 + v_{vehicle}^2)$. Particularly, the total mass $\dot{m}$ of rain may be the sum of the mass $\dot{m}_{upper}$ of rain applied to the upper surface portion 810 and the mass $\dot{m}_{front}$ of rain applied to the front surface 820.

In addition, when the vehicle speed direction and the raindrop speed component (i.e., $v_{wind}$ cos θ) of a raindrop speed, which is in parallel to the vehicle speed direction, the total driving load p due to raining may be given according to $½\dot{m}[(v_{wind}^2 \sin^2 θ) + (v_{vehicle}^2 - v_{wind}^2 \cos^2 θ)]$. In particular, the total mass $\dot{m}$ of rain may be given according to $$l_{width}λρ\left(\frac{l_{hight}}{v_{limit}}v_{vehicle} + l_{length}\right).$$

According to an exemplary embodiment, when the vehicle speed is greater than a wind speed and a limit speed of rain by a predetermined size or greater ($v_{wind} \ll v_{vehicle}$, and $v_{limit} \ll v_{vehicle}$), the driving load due to raining may be simplified according to $p = kλv_{vehicle}^3$. In particular, k is a proportional constant. Accordingly, the driving load due to raining is proportional to the cube of speed, which is similar to the case of a load due to air resistance, and thus when it rains, an air resistance coefficient Cd may be considered to be corrected to Cd+kλ. Accordingly, in the configuration of the controller 700' shown in FIG. 7B, when the condition determination unit 710 determines that the vehicle speed is greater than the wind speed and a limit speed of rain by a predetermined size or greater, the substitute driving load calculation unit 730 may be configured to calculate the driving load due to raining according to "$p = kλv_{vehicle}^3$".

In summary, the aforementioned procedure of calculating the driving load due to weather may include 1) acquiring weather information regarding rain or snow, 2) calculating a first driving load due to the mass of moisture applied to an upper surface portion of a vehicle based on the weather information, 3) calculating a second driving load due to the mass of moisture applied to a front surface portion of the vehicle based on the weather information, and 4) calculating a third driving load that is a driving load due to weather by summing the first driving load and the second driving load. Particularly, the total driving load may be obtained by summing the third driving load and a fourth driving load including rolling resistance, air resistance, and gradient resistance which are general driving loads. When the vehicle speed is determined to be greater than a wind speed and a limit speed of rain by a predetermined size or greater from information acquired from "1) acquiring weather information regarding rain or snow", the third driving load may be substituted with $p = kλv_{vehicle}^3$ and may be added to the fourth driving load instead of summing the first driving load and the second driving load.

Figure 9A:
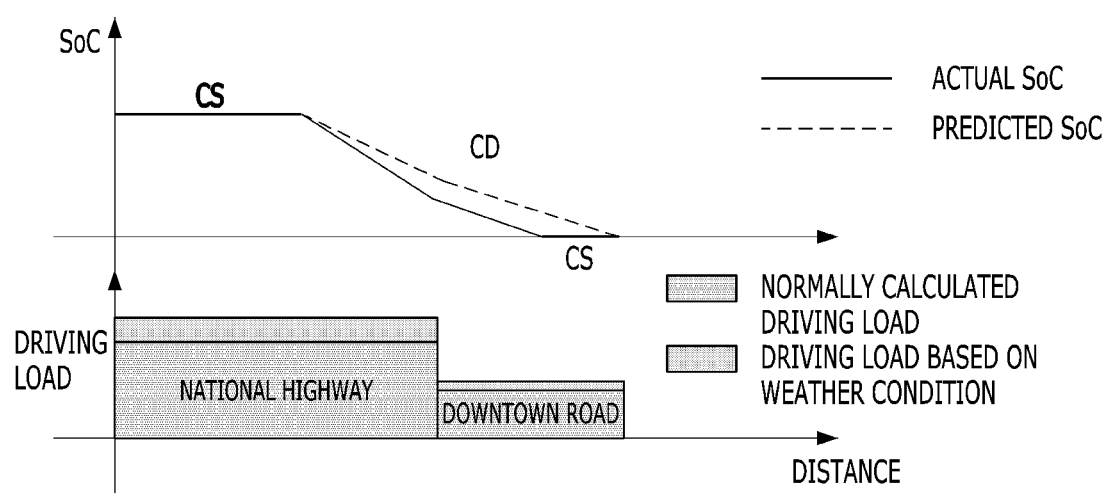
FIGS. 9A-9B are diagrams for comparison between a general prediction result and an effect of predicting a driving load according to an embodiment of the present disclosure when adaptive mode switching control is applied.
Figure 9B:
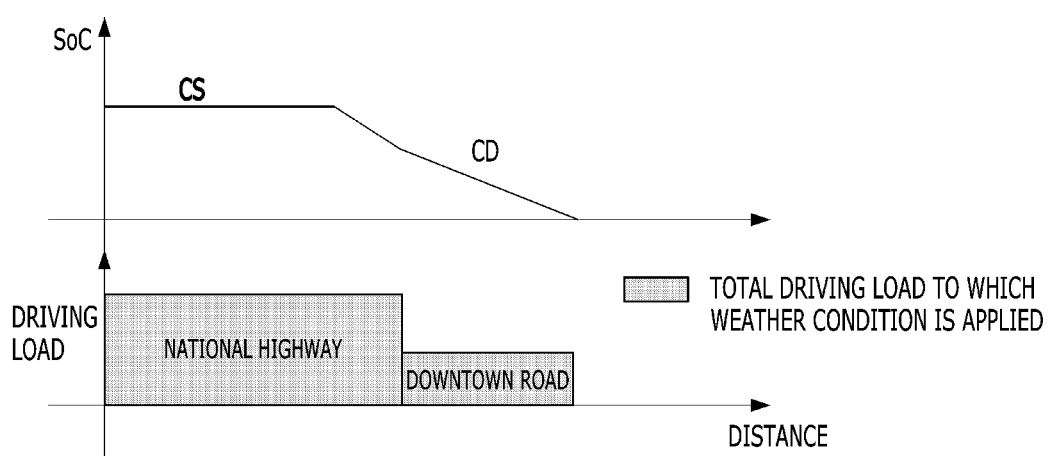

Hereinafter, an effect of the aforementioned method of calculating the driving load due to weather will be described with reference to FIGS. 9A-9B and 10A-10B. In FIGS. 9A-9B and 10A-10B, a predetermined amount of rainfall is assumed. FIGS. 9A-9B is a diagram for comparison between a general prediction result and an effect of predicting a driving load according to an exemplary embodiment of the present disclosure when adaptive mode switching control is applied. In FIGS. 9A-9B, it is assumed that a vehicle travels a predetermined distance on a national highway, and the vehicle is predicted to travel on a downtown road with a shorter distance and a lower driving load than the highway.

Referring to FIG. 9A, when adaptive driving mode switching control is applied, if a driving load due to raining is not considered, a driving load at a rear part of the highway and the downtown road is predicted to be less than the reality, and thus a CS mode needs to be maintained shorter than actual necessity. Accordingly, a vehicle is not capable of finishing a route in a CD mode due to a higher driving load than predicted and is compulsorily transitioned into a CS mode corresponding to a low load driving and poor efficiency at the rear part. In contrast, as shown in FIG. 9B, when mode switching is scheduled based on a driving load due to rain, the vehicle may be capable of finishing the route without compulsory transition to a CS mode on the downtown road.

Figure 10A:
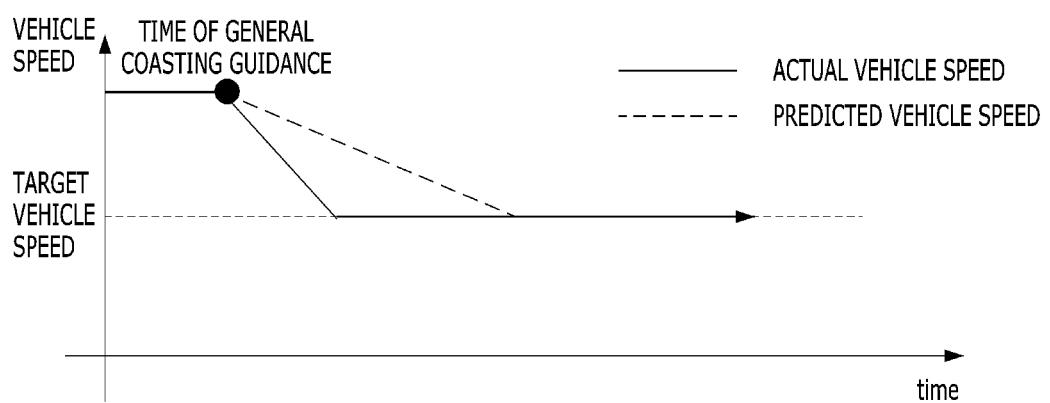
FIGS. 10A-10B are diagrams for comparison between a general prediction result and an effect of predicting a driving load according to an embodiment of the present disclosure in the case of control of coasting driving guidance.
Figure 10B:
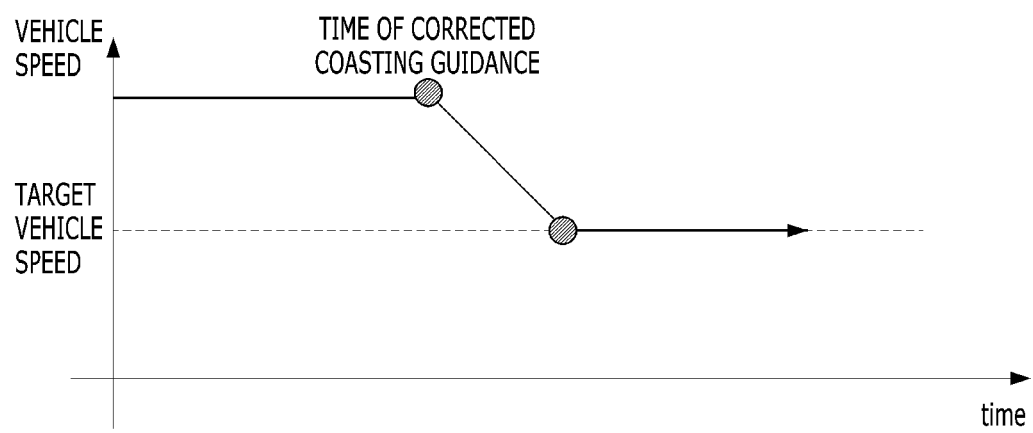

FIGS. 10A-10B is a diagram for comparison between a general prediction result and an effect of predicting a driving load according to an exemplary embodiment of the present disclosure in the case of control of coasting driving guidance.

First, referring to FIG. 10A, when control of coasting driving guidance is applied, if the driving load due to snowing is not considered, deceleration is increased than expected, and thus a target vehicle speed may be reached earlier than expected, unnecessary low-speed traveling may be performed, and fuel efficiency may be reduced due to re-acceleration depending on a driver. In contrast, as shown in FIG. 10B, when coasting driving guidance is performed based on the driving load due to raining, a target vehicle speed may be reached at a desired time point.

Although the aforementioned assumption is described based on snow, a vertical limit speed of snowflake and density of snowflake are corrected to smaller values, in which case the aforementioned assumption is applied to the case of snowing in a similar way. Accordingly, both rain and snow correspond moisture, and thus a driving load may be calculated according to influence of the mass of moisture applied to front and upper surface portions of a vehicle based on the limit speed and density of moisture.

In addition, when a scheduling function based on a driving load, such as coasting driving guidance or mode switching, is performed, if initial scheduling is performed based on a driving load (e.g., the aforementioned fourth driving load) calculated using a general method, and then, the third driving load due to rain or snow is calculated by acquiring/applying real-time weather information or the like, the result obtained by re-scheduling the total driving load updated by summing the third driving load and the fourth driving load may be immediately applied to the scheduling function. In addition, the result obtained by re-scheduling the updated total driving load may be applied to the scheduling function when the third driving load is equal to or greater than a predetermined size or is equal to or greater than a predetermined ratio of the fourth driving load. When re-scheduling is performed using this method, visual information may be output in a predetermined form on a display element included in a vehicle, for example, a display of an audio/video/navigation (AVN) system, a cluster, or a head up display (HUD).

A vehicle related to at least one exemplary embodiment of the present disclosure configured above may perform driving control based on more accurate prediction of a driving load. In particular, the efficiency of driving mode scheduling function such as driving mode switching and coasting driving guidance may be enhanced by predicting a driving load based on a weather condition.

It will be appreciated by persons skilled in the art that that the effects that could be achieved with the present disclosure are not limited to what has been particularly described hereinabove and other advantages of the present disclosure will be more clearly understood from the detailed description. The aforementioned present disclosure can also be embodied as computer readable code stored on a computer readable recording medium. The computer readable recording medium is any data storage device that may store data which can thereafter be read by a computer. Examples of the non-transitory computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method of calculating a driving load of a vehicle, comprising:
   acquiring, by a controller, weather information;
   calculating, by the controller, a first driving load applied to an upper surface portion of the vehicle based on the weather information;
   calculating, by the controller, a second driving load applied to a front surface portion of the vehicle based on the weather information;
   calculating, by the controller, a third driving load that is a driving load due to weather by summing the first driving load and the second driving load,
   wherein the weather information includes information regarding rain or snow and information regarding a wind direction and a wind speed; and
   comparing, by the controller, a limit speed due to the rain or the snow and the wind speed with a vehicle speed,
   wherein the calculating the first driving load, calculating the second driving load, and the calculating the third driving load are performed when a difference between the vehicle speed, and the limit speed and the wind speed is less than a predetermined size.

2. The method of 1, further comprising:
   calculating, by the controller, a total driving load by summing the third driving load and a fourth driving load including at least one of rolling resistance, air resistance, or gradient resistance.

3. The method of claim 1, wherein each of the calculating the first driving load and the calculating the second driving load is performed based on whether a moisture speed component in a parallel direction to a vehicle speed direction of the vehicle is the same as the vehicle speed direction based on the information regarding the wind direction and the wind speed.

4. The method of claim 3, wherein, when the moisture speed component and the vehicle speed direction are the same, the calculating the first driving load is performed using Equation A below:

$$P_{upper} = \frac{1}{2} \dot{m}_{upper}(v_{wind}^2 + v_{vehicle}^2) \quad \text{Equation A}$$

wherein, $P_{upper}$ is the first driving load, $\dot{m}_{upper}$ is a mass of moisture applied to the upper surface portion, $V_{wind}$ is the wind speed, and $V_{vehicle}$ is the vehicle speed.

5. The method of claim 3, wherein, when the moisture speed component and the vehicle speed direction are opposite, the calculating the first driving load is performed using Equation B below:

$$P_{upper} = \frac{1}{2} \dot{m}_{upper}[(v_{wind}^2 \sin^2\theta) + (v_{vehicle}^2 - v_{wind}^2 \cos^2\theta)] \quad \text{Equation B}$$

wherein, $P_{upper}$ is the first driving load, $\dot{m}_{upper}$ is a mass of moisture applied to the upper surface portion, $V_{wind}$ is the wind speed, $V_{vehicle}$ is the vehicle speed, and $\theta$ is an angle between the wind speed and the vehicle speed.

6. The method of claim 3, wherein, when the moisture speed component and the vehicle speed direction are the same, the calculating the second driving load is performed using Equation C below:

$$p_{front} = \frac{1}{2}\dot{m}_{front}(v_{wind}^2 + v_{vehicle}^2) \qquad \text{Equation C}$$

wherein, $P_{front}$ is the second driving load, $\dot{m}_{front}$ is a mass of moisture applied to the front surface portion, $V_{wind}$ is the wind speed, and $V_{vehicle}$ is the vehicle speed.

7. The method of claim 3, wherein, when the moisture speed component and the vehicle speed direction are opposite, the calculating the second driving load is performed using Equation D below:

$$p_{front} = \frac{1}{2}\dot{m}_{front}[(v_{wind}^2\sin^2\theta) + (v_{vehicle}^2 - v_{wind}^2\cos^2\theta)] \qquad \text{Equation D}$$

wherein, $P_{front}$ is the second driving load, $\dot{m}_{front}$ is a mass of moisture applied to the front surface portion, $V_{wind}$ is the wind speed, $V_{vehicle}$ is the vehicle speed, and $\theta$ is an angle between the wind speed and the vehicle speed.

8. The method of claim 1, wherein each of the calculating the first driving load and the calculating the second driving load is performed assuming collision between moisture involved in the snow or the rain and the vehicle is in perfectly inelastic collision.

9. The method of claim 1, wherein, when the difference between the vehicle speed, and the limit speed and the wind speed is equal to or greater than the predetermined size, the third driving load is substituted with a driving load acquired using Equation E below:

$$p = k\lambda v_{vehicle}^3 \qquad \text{Equation E}$$

wherein, P is the third driving load, k is a proportional constant, $\lambda$ is the amount of rainfall per hour, and $V_{vehicle}$ is the vehicle speed.

10. A non-transitory computer readable recording medium having recorded thereon a program for executing the method of claim 1.

11. A vehicular controller for calculating driving load information, comprising:
 a first calculation unit configured to calculate a first driving load applied to an upper surface portion of a vehicle based on weather information regarding rain or snow;
 a second calculation unit configured to calculate a second driving load applied to a front surface portion of the vehicle based on the weather information; and
 a third calculation unit configured to calculate a third driving load that is a driving load due to weather by summing the first driving load and the second driving load,
 a condition determination unit configured to compare a limit speed due to the rain or the snow included in the weather information and a wind speed with a vehicle speed,
 wherein, when a difference between the vehicle speed, and the limit speed and the wind speed is less than a predetermined size, the third driving load is calculated based on the first driving load and the second driving load.

12. A vehicle, comprising:
 a first controller configured to acquire weather information regarding rain or snow;
 a second controller configured to calculate a third driving load that is a driving load due to weather based on a first driving load applied to an upper surface portion of the vehicle and a second driving load applied to a front surface portion of the vehicle based on the weather information; and
 a third controller configured to execute a driving scheduling function using a total driving load corrected based on the third driving load,
 wherein the second controller includes a condition determination unit configured to compare a limit speed of rain or snow included in the weather information and a wind speed with a vehicle speed, and
 wherein, when a difference between the vehicle speed, and the limit speed and the wind speed is less than a predetermined size, the third driving load is calculated based on the first driving load and the second driving load.

13. The vehicle of claim 12, wherein the driving scheduling function includes at least one of a driving mode switching scheduling function or a coasting driving time guidance function of an eco-friendly vehicle.

14. The vehicle of claim 12, wherein the third controller is configured to perform first control on the driving scheduling function based on a fourth driving load including at least one of rolling resistance, air resistance, or gradient resistance and perform second control on the driving scheduling function based on the fourth driving load when the third driving load is equal to or greater than a predetermined size or is equal to or greater than a predetermined ratio of the fourth driving load.

15. The vehicle of claim 14, further comprising:
 a display configured to output a result obtained by performing the second control.

16. The vehicle of claim 12, wherein, when the difference between the vehicle speed, and the limit speed and the wind speed is less than the predetermined size, the second controller substitutes a driving load calculated according to Equation F below with the third driving load:

$$p = k\lambda v_{vehicle}^3 \qquad \text{Equation F}$$

wherein, P is the third driving load, k is a proportional constant, $\lambda$ is the amount of rainfall per hour, and $V_{vehicle}$ is the vehicle speed.

* * * * *